United States Patent [19]
Jakobsson et al.

[11] Patent Number: 5,924,088
[45] Date of Patent: Jul. 13, 1999

[54] INDEX SELECTION FOR AN INDEX ACCESS PATH

[75] Inventors: Hakan Jakobsson, San Francisco; Michael Depledge, San Jose; Cetin Ozbutun, San Carlos; Jeffrey I. Cohen, Sunnyvale, all of Calif.

[73] Assignee: Oracle Corporation, Redwood Shores, Calif.

[21] Appl. No.: 08/808,094

[22] Filed: Feb. 28, 1997

[51] Int. Cl.⁶ .................................................... G06F 17/30
[52] U.S. Cl. .......................... 707/2; 707/1; 707/3; 707/4
[58] Field of Search ................. 707/1, 2, 3, 7, 707/4

[56] References Cited

U.S. PATENT DOCUMENTS

| | | | |
|---|---|---|---|
| 5,043,872 | 8/1991 | Cheng et al. ............................... | 707/2 |
| 5,412,806 | 5/1995 | Du et al. .................................... | 707/2 |
| 5,495,608 | 2/1996 | Antoshenkov ............................. | 707/3 |
| 5,732,258 | 3/1998 | Jakobsson et al. ........................ | 707/4 |
| 5,761,653 | 6/1998 | Schiefer et al. ........................... | 707/2 |
| 5,778,353 | 7/1998 | Schiefer et al. ........................... | 707/2 |

OTHER PUBLICATIONS

"Oracle TextServer3 Concepts, Version 3," Oracle Corporation (Part No. A24984–1, 1995, pp. 3–1 to 3–23).
"Oracle Textserver3 Concepts, Release 3.1," Oracle Corporation (Part No. A41697–2), 1996, pp. 3–1 to 3–29.

*Primary Examiner*—Paul V. Kulik
*Assistant Examiner*—Greta L. Robinson
*Attorney, Agent, or Firm*—McDermott, Will & Emery

[57] ABSTRACT

A list of indexes, from which indexes are selected for an index access path, is sorted by number of columns upon which each index is built. From the sorted list of indexes, a set of index access methods is generated in a heuristically ordered set of passes from a given WHERE clause. The index access methods that comprise the index access path are selected from the set of index access methods according to a cost/benefit analysis.

26 Claims, 9 Drawing Sheets

| TABLE T1 | | | | |
|---|---|---|---|---|
| | ROWID | COLUMN C1 | COLUMN C2 | COLUMN C3 |
| 130 | 1 | 1 | 1 | 1 |
| 132 | 2 | 3 | 7 | 2 |
| 134 | 3 | 2 | 4 | 3 |
| 136 | 4 | 4 | 2 | 4 |
| 138 | 5 | 3 | 8 | 5 |
| 140 | 6 | 4 | 5 | 6 |
| 142 | 7 | 2 | 3 | 7 |
| 144 | 8 | 2 | 9 | 8 |
| 146 | 9 | 3 | 6 | 4 |
| 148 | 10 | 6 | 4 | 5 |
| 150 | 11 | 3 | 1 | 6 |
| 152 | 12 | 7 | 7 | 7 |
| 154 | 13 | 2 | 5 | 8 |
| 156 | 14 | 2 | 2 | 5 |
| 158 | 15 | 8 | 8 | 6 |
| 160 | 16 | 1 | 6 | 7 |
| 162 | 17 | 5 | 3 | 8 |
| 164 | 18 | 6 | 9 | 9 |

TABLE T1

| ROWID | COLUMN C1 | COLUMN C2 | COLUMN C3 |
|---|---|---|---|
| 1 | 1 | 1 | 1 |
| 2 | 3 | 7 | 2 |
| 3 | 2 | 4 | 3 |
| 4 | 4 | 2 | 4 |
| 5 | 3 | 8 | 5 |
| 6 | 4 | 5 | 6 |
| 7 | 2 | 3 | 7 |
| 8 | 2 | 9 | 8 |
| 9 | 3 | 6 | 4 |
| 10 | 6 | 4 | 5 |
| 11 | 3 | 1 | 6 |
| 12 | 7 | 7 | 7 |
| 13 | 2 | 5 | 8 |
| 14 | 2 | 2 | 5 |
| 15 | 8 | 8 | 6 |
| 16 | 1 | 6 | 7 |
| 17 | 5 | 3 | 8 |
| 18 | 6 | 9 | 9 |

Figure 1

INDEX (C1) — 200

| KEYVALUE (210) | ROWIDs (220) |
|---|---|
| 1 | 1,16 |
| 2 | 3,7,8,13,14 |
| 3 | 2,5,9,11 |
| 4 | 4,6 |
| 5 | 17 |
| 6 | 10,18 |
| 7 | 12 |
| 8 | 15 |

| | KEYVALUE | ROWIDs |
|---|---|---|
| 330 | 1 | 1, 11 |
| 332 | 2 | 4, 14 |
| 334 | 3 | 7, 17 |
| 336 | 4 | 3, 10 |
| 338 | 5 | 6, 13 |
| 340 | 6 | 9, 16 |
| 342 | 7 | 2, 12 |
| 344 | 8 | 5, 15 |
| 346 | 9 | 8, 18 |

INDEX (C2) — 300

Figure 3

| INDEX (C3) | |
|---|---|
| KEYVALUE (410) | ROWIDs (420) |
| 1 | 1 |
| 2 | 2 |
| 3 | 3 |
| 4 | 4,9 |
| 4 | 9 |
| 5 | 5,10,14 |
| 6 | 6,11,15 |
| 7 | 7,12,16 |
| 8 | 8,13,17 |
| 9 | 18 |

Figure 4

| | INDEX (C3,C1) | |
|---|---|---|
| | KEYVALUE 510 | ROWIDs 520 |
| 530 | 1,1 | 1 |
| 532 | 2,3 | 2 |
| 534 | 3,2 | 3 |
| 536 | 4,3 | 9 |
| 538 | 4,4 | 4 |
| 540 | 5,2 | 14 |
| 542 | 5,3 | 5 |
| 544 | 5,6 | 10 |
| 546 | 6,3 | 11 |
| 548 | 6,4 | 6 |
| 550 | 6,8 | 15 |
| 552 | 7,1 | 16 |
| 554 | 7,2 | 7 |
| 556 | 7,7 | 12 |
| 558 | 8,2 | 8,13 |
| 560 | 8,5 | 17 |
| 562 | 9,6 | 18 |

INDEX SELECTION FOR AN INDEX ACCESS PATH

RELATED APPLICATIONS

The present application is related to: U.S. patent application Ser. No. 08/807,344, entitled "CREATING BITMAPS FROM MULTI-LEVEL IDENTIFIERS", filed by Cetin Ozbutun, Michael Depledge, Hakan Jakobsson, Mark Kremer, Jeffrey I. Cohen, Quoc Tai Tran, and Alexander C. Ho on the equal day herewith, the contents of which are incorporated herein by reference.

U.S. patent application Ser. No. 08/808,584, entitled "BITMAP SEGMENTATION", filed by Cetin Ozbutun, Jeffrey I. Cohen, Hakan Jakobsson, Mark Kremer, Michael Depledge, Quoc Tai Tran, Alexander C. Ho, and Julian Hyde, on the equal day herewith, the contents of which are incorporated herein by reference.

U.S. patent application Ser. No. 08/752,128, entitled "METHOD AND APPARATUS FOR PROCESSING COUNT STATEMENTS IN A DATABASE SYSTEM", filed by Cetin Ozbutun, Michael Depledge, Hakan Jakobsson, and Jeffrey I. Cohen, on Nov. 20, 1996, the contents of which are incorporated herein by reference.

U.S. patent application Ser. No. 08/808,097, entitled "GROUP BY AND DISTINCT SORT ELIMINATION USING COST-BASED OPTIMIZATION", filed by Jeffrey Ira Cohen, Cetin Ozbutun, Michael Depledge, and Hakan Jakobsson, on the equal day herewith, the contents of which are incorporated herein by reference.

U.S. patent application Ser. No. 08/808,096, entitled "METHOD AND APPARATUS FOR USING INCOMPATIBLE TYPES OF INDEXES TO PROCESS A SINGLE QUERY", filed by Jeffrey Ira Cohen, Cetin Ozbutun, Hakan Jakobsson, and Michael Depledge, on the equal day herewith, the contents of which are incorporated herein by reference.

U.S. patent application Ser. No. 08/807,429, entitled "QUERY PROCESSING USING COMPRESSED BITMAPS", filed by Cetin Ozbutun, Jeffry I. Cohen, Michael Depledge, Julian Hyde, Hakan Jakobsson, Mark Kremer, and Quoc Tai Tran, on the equal day herewith, the contents of which are incorporated herein by reference.

U.S. patent application Ser. No. 08/807,451, entitled "BITMAPPED INDEXING WITH HIGH GRANULARITY LOCKING", filed by Michael Depledge, Jeffrey I. Cohen, Hakan Jakobsson, Mark Kremer, Cetin Ozbutun, Quoc Tai Tran, and Alexander C. Ho, on the equal day herewith, the contents of which are incorporated herein by reference.

U.S. patent application Ser. No. 08/808,585, entitled "UPDATING BITMAPPED INDEXES", filed by Michael Depledge, Hakan Jakobsson, Cetin Ozbutun, Jeffrey I. Cohen, and Quoc Tai Tran, on the equal day herewith, the contents of which are incorporated herein by reference.

U.S. patent application Ser. No. 08/808,560, entitled "BITMAP INDEX COMPRESSION", filed by Jeffrey I. Cohen, Michael Depledge, Hakan Jakobsson, Mark Kremer, Cetin Ozbutin, and Quoc Tai Tran, on the equal day herewith, the contents of which are incorporated herein by reference.

U.S. patent application Ser. No. 08/808,586, entitled "COMBINING BITMAPS WITHIN A MEMORY LIMIT", filed by Cetin Ozbutun, Jeffry I. Cohen, Michael Depledge, Julian Hyde, Hakan Jakobsson, Mark Kremer, and Quoc Tai Tran, on the equal day herewith, the contents of which are incorporated herein by reference.

FIELD OF THE INVENTION

The present invention relates to computer database systems and more particularly to executing a query on a database.

BACKGROUND OF THE INVENTION

Relational databases store information in indexed tables. A user retrieves information from the tables by entering input that is converted to queries by a database application. The database application submits the queries to a database server. In response to a query, the database server accesses the tables specified in the query to determine which information within the tables satisfies the queries. The information that satisfies the queries is then retrieved by the database server and transmitted to the database application and ultimately to the user.

For any given database application, the queries must conform to the rules of a particular query language. Most query languages provide users with a variety of ways to specify information to be retrieved. For example, in the Structured Query Language (SQL), the following query requests the retrieval of the information contained in all rows of table t1:

SELECT * FROM t1

Figure 1:
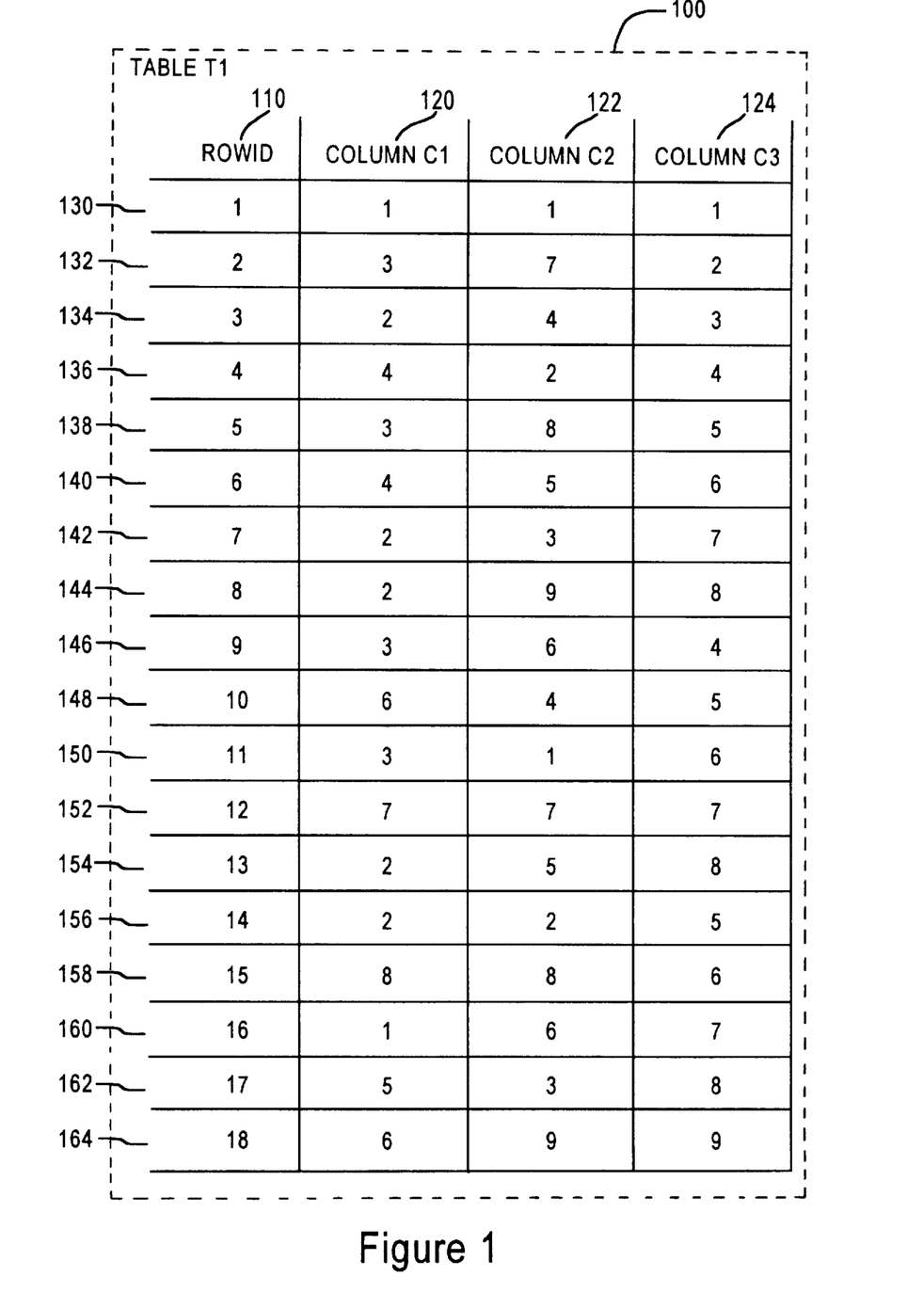
FIG. 1 is a representation of a table in a database system.

Table t1 (100) is shown in FIG. 1. Table 100 comprises three user columns, 120–124, and eighteen rows (130–164). Table 100 also has an internal column, or pseudocolumn, referred to as rowid. A table's rowid pseudocolumn is not displayed when the structure of the table is list. However the rowid is retrievable by query and uniquely identifies a row in the table. Rowid pseudocolumn 110 has rowid entries that correspond to rows 130–164. Thus, a rowid of eight for table 100 specifies row 144 and no other row of table 100. Columns 120–124 each store numbers, and each column has a name. The name of column 120 is c1, and the names of columns 122 and 124 are c2 and c3, respectively.

The user may constrain the query to retrieve a smaller amount of information by adding a WHERE clause, as in the following query:

SELECT * FROM t1
WHERE c1=2 AND c2>5 AND c3=8

The WHERE clause imposes a constraint that each row of table t1 must meet to satisfy the query. In this case, the WHERE clause has three predicates, c1=2, c2>5, and c3=8. These predicates mean that all the retrieved rows of table t1 must have a value equal to two in column c1, a value greater than five in column c2, and a value equal to eight in column c3, respectively. For table 100, the query would retrieve only row 144.

Without special processing, a database server would have to fetch every row of a table and inspect every column named in the WHERE clause to perform the query. However, such an approach impairs the overall database system performance because many disk blocks would have to be read. As a result, many database systems provide indexes to increase the speed of the data retrieval process. A database index is similar to a normal index found at the end of a book, in that both kinds of indexes comprise an ordered list of information accompanied with the location of the information. Values in one or more columns are stored in an index, maintained separately from the actual database table.

Figure 2A:
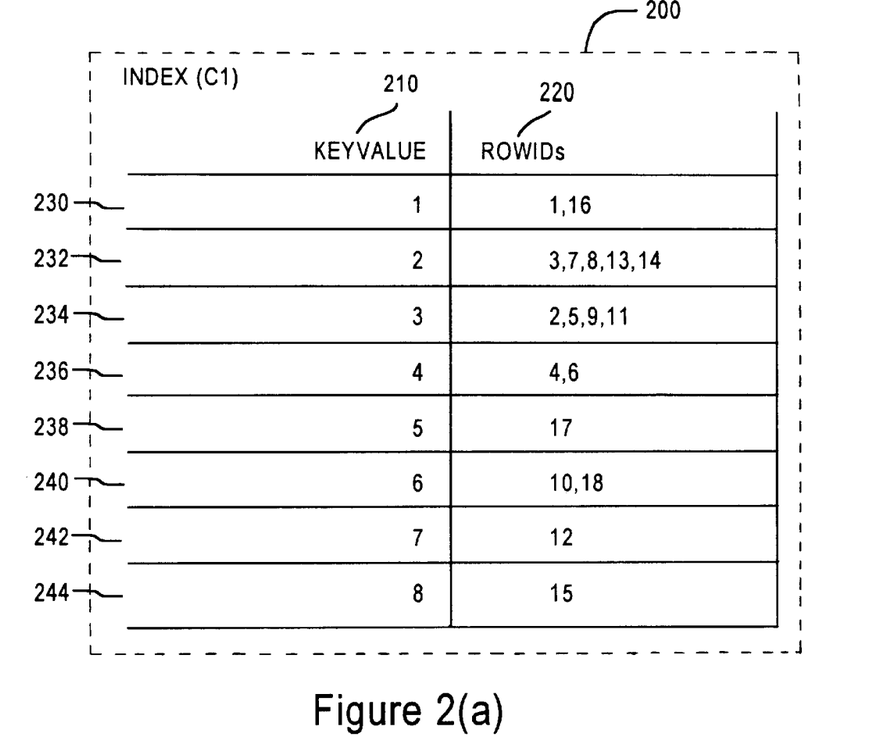
FIG. 2(a) is a representation of a single-column index in a database system.

In FIG. 2(*a*), index 200 is an index built on column c1 of table 100. Each entry, 230–244, in index 200 has a key value 210 and at least one rowid 220. Since the key values are ordered, it can quickly be determined, for example, that the rows that have a key value of "2" in column c1 are those rows associated with rowids 3, 7, 8, 13, and 14 (see index entry 232). An index may be implemented in a variety of ways well known in the art, such as with B-trees, depending on the specific performance characteristics desired for the database system.

Figure 2B:
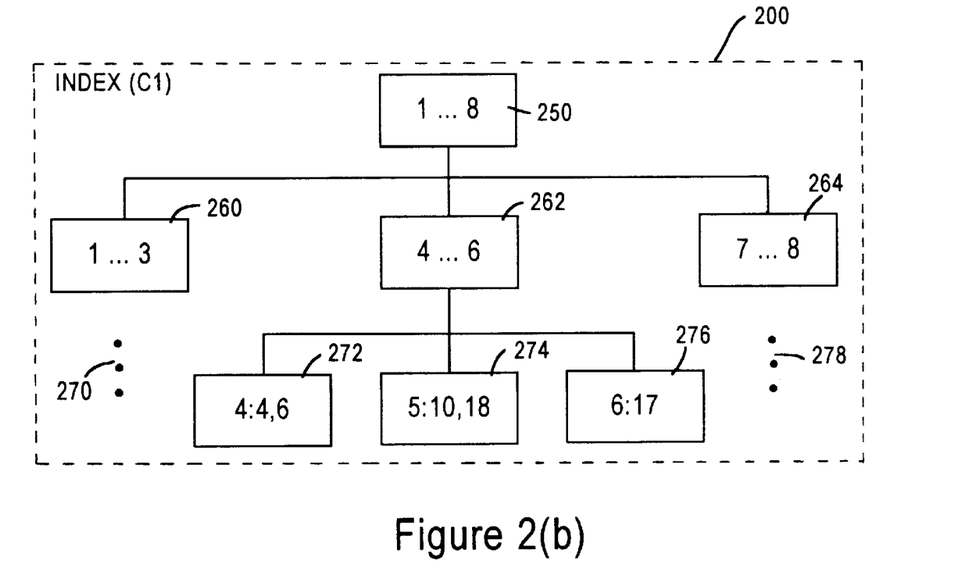
FIG. 2(b) is a representation of an implementation of a single-column index in a database system.

FIG. 2(b) shows a B-tree implementation of index 200. A B-tree consists of a set of nodes connected in a hierarchical arrangement. A B-tree contains two types of nodes: branch nodes and leaf nodes. Leaf nodes reside at the lowest level of the hierarchy and contain values from the actual column to which the index corresponds. For example, B-tree 200 is an index for column 120 of table 100 and has leaf nodes 272, 274, and 276. Node 272 is a leaf node that contains a value from column 120. Along with the values, leaf nodes store the rowid of the rows that contain the values. For example, in addition to the number 4, leaf node 272 contains the rowid 6 which corresponds to the row 140 of table 100 that contains the number 4 in column 120. In other words, leaf node 272 contains index entry 236, and a leaf node may contain more than one index entry.

All the nodes in B-tree 200 that are not leaf nodes are branch nodes. Branch nodes contain information that indicates a range of values. In the illustrated B-tree 200, nodes 250, 260, 262, and 264 are branch nodes and therefore correspond to a range of values. The range of values identified in each branch node is such that all nodes that reside below a given branch node correspond to values that fall within the range of values represented by the branch node. For example, node 262 is a branch node that corresponds to numbers in the numerical range from four to six. Consequently, nodes 272, 274, and 276 which all reside below node 262 in the hierarchy, correspond to values that fall within the range from four to six. Reference numbers 270 and 278 represent connections to other portions of B-tree 200 that are not shown.

A database server can use index 200 to process the exemplary query listed above because index 200 is built on a column referenced in one of the predicates of the WHERE clause. Specifically, the WHERE clause contains the predicate c1=2, and index 200 is built on column c1.

A combination of (1) an index and (2) a predicate containing a column upon which the index is built constitutes an "index access method." For example, the WHERE clause described above includes the predicate c1=2. Thus, the database server can use an index access method which specifies that index 200 is accessed to retrieve the rowids of the rows in table 100 where c1=2. Once the rowids are retrieved from index 200, the corresponding rows are retrieved from the table 100. In using index 200 with the predicate c1=2 as an index access method, only five rows instead of eighteen rows would have to be fetched from table 100, reducing the amount of overhead required to process the query.

Figure 4:
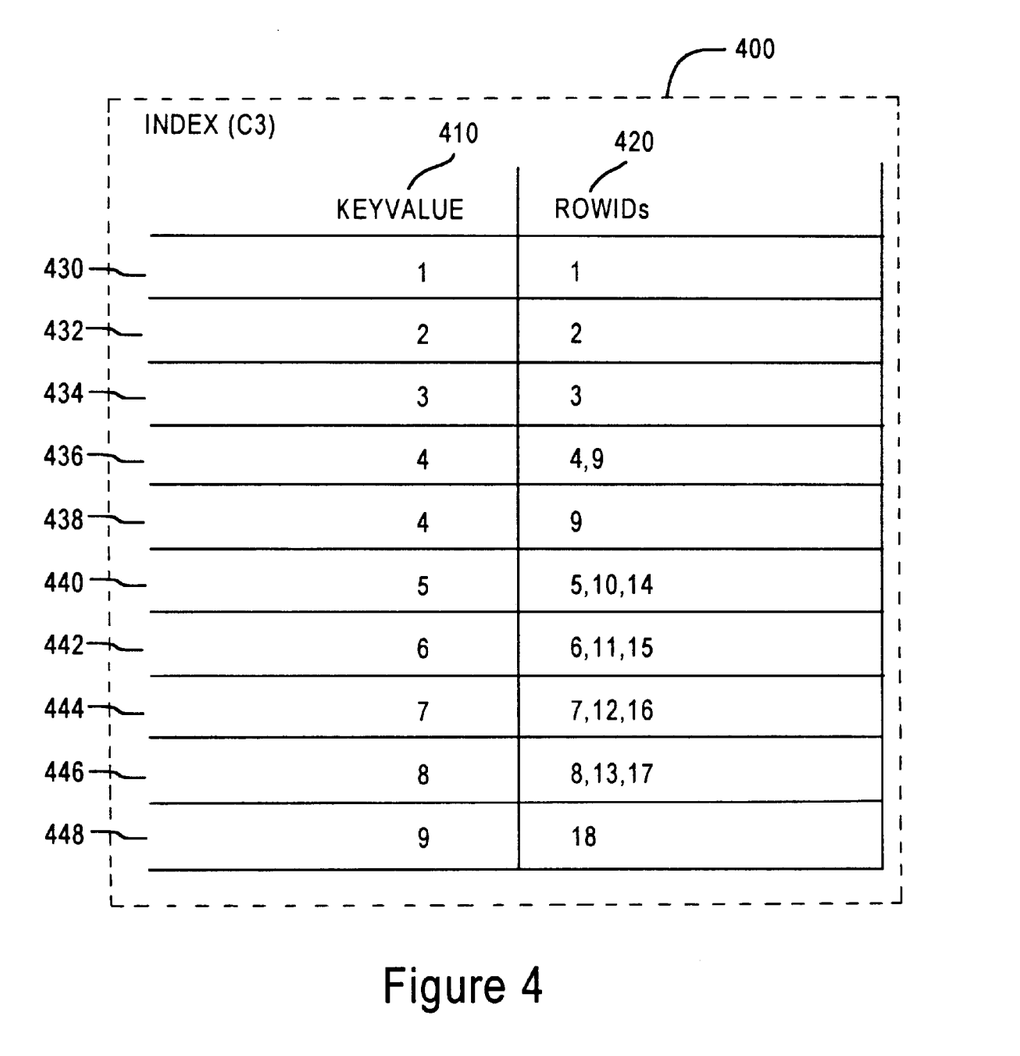
FIG. 4 is a representation of a single-column index in a database system.
Figure 5:
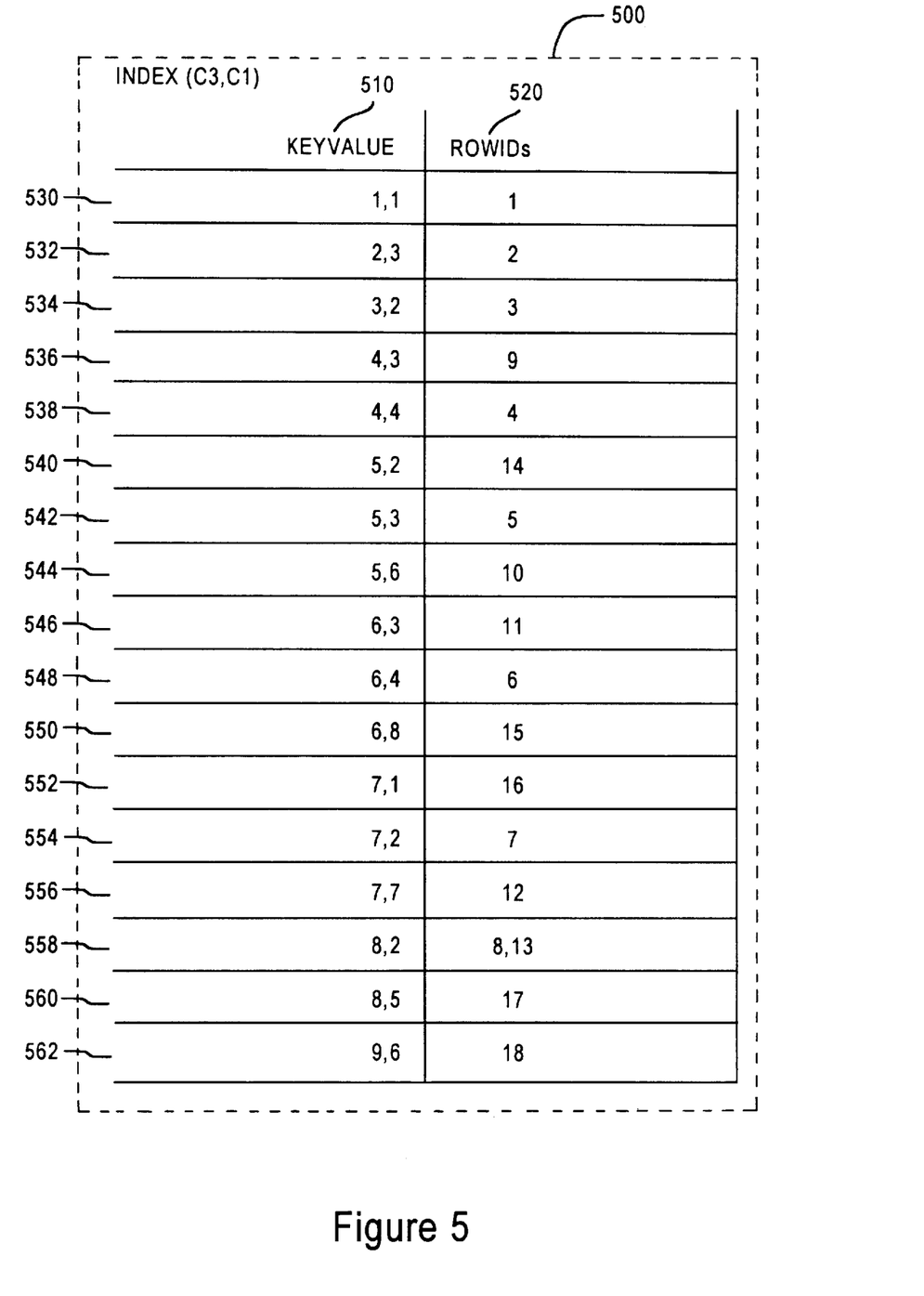
FIG. 5 is a representation of multi-column index in a database system.

For a given table, there may be several indexes available for use during a data retrieval. For example, table 100 may have an index based on column 120 (index 200), another index based on column 122 (index 300 of FIG. 3), and an index based on column 124 (index 400 of FIG. 4). Moreover, index 500 of FIG. 5 is a multi-column index built on two columns 124 and 120, in that order, of table 100. The key value of a multi-column index is a concatenation of column values from the index upon which the multi-column index was built. For example, the key value for row 558 lists a value 8 taken from column 124 of table 100 followed by a value of 2 taken from column 120 of table 100.

An index access path is a combination of index access methods used by a database server in retrieving data from a table. Conventionally, database servers generate index access paths on an ad-hoc, first-come, first-served basis. Thus, a database server may always use an index on a column specified in the first predicate of a WHERE clause, even though other indexes may be available for the columns specified in subsequent predicates of the WHERE clause.

A drawback to the conventional approach of generating an index access path is that the performance characteristics for a data retrieval may vary greatly depending on the choice of an index access path. In the example given above, accessing table 100 based on index 200 for the WHERE clause yields a rowid list of five rowids (index entry 232). Accessing table 100 based on index 300, however, yields a rowid list of eight entries (see index entries 340–346). Moreover, accessing table 100 based on index 400 yields a three-entry rowid list (index entry 446). Finally, using index 500 to access table 100 yields a two-entry rowid list (entry 558). Thus, an index access path using multi-column index 500 fetches the least number of rows from table 100. Of the single column indexes, index 400 reduces the amount of processing the most, requiring only three row fetches. However, the first-come, first-served approach will not select either index 400 or 500 if the predicate referring to the columns indexed by either index is not first in the WHERE clause. Therefore, it is desirable to provide a way in which particular indexes with superior performance characteristics are selected for an index access path.

In another conventional approach, a database server may generate for a query an index access path that makes use of more than one index. In the example given above, if a database server uses both indexes 200 and 400 to process the exemplary query, using index 200 for the c1=2 predicate generates a rowid list of 3, 7, 8, 13, and 14. Using index 400 for the c3=8 predicate generates a rowid list of 8, 13, 17, and 18. After the rowid lists have been generated, the database server finds the intersection of the two lists to determine the rows that satisfy both conditions. In this case, these rows are identified by the rowids of 8 and 13. Therefore, a database server using a plurality of indexes to generate and intersect a plurality of rowid lists can reduce the processing involved in handling a query. In this case, only two rows from table 100 (i.e. rows 144 and 154) need to be fetched.

Figure 3:
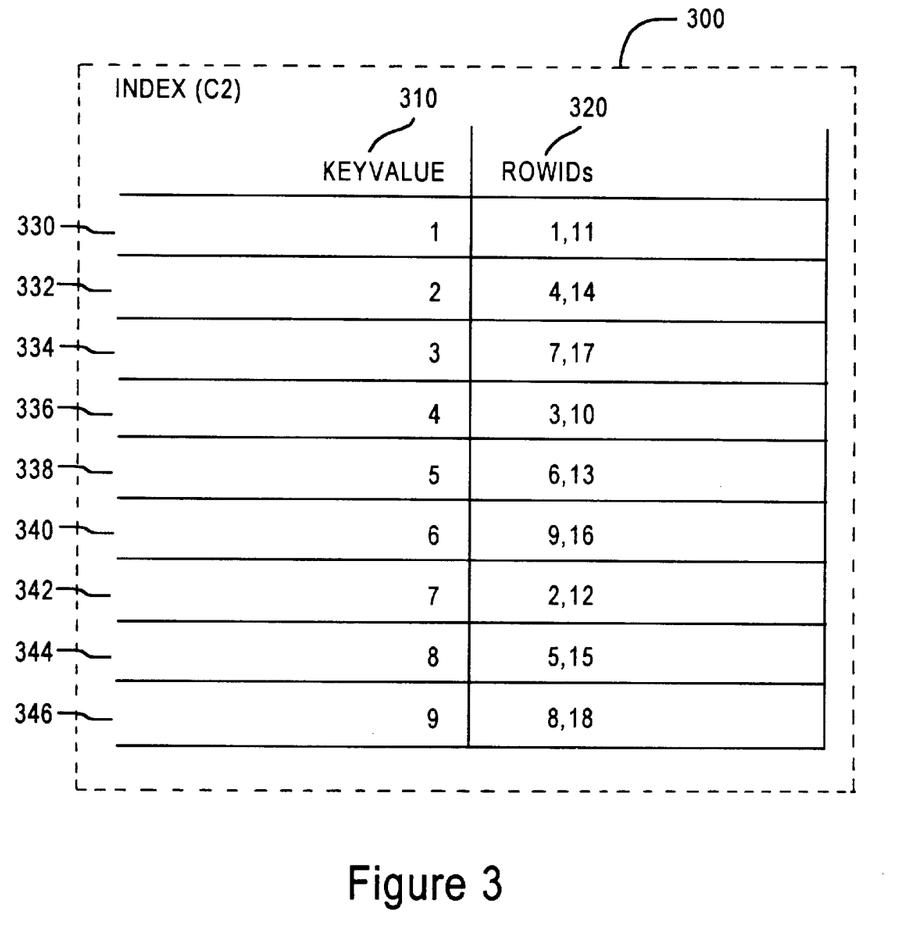
FIG. 3 is a representation of a single-column index in a database system.

However, generating lists of rowids and intersecting the lists also consumes processing resources, and it is possible to overselect the number of indexes to use. For example, using index 200 generates a rowid list of 3, 7, 8, 13, and 4 and using index 400 yields a rowid list of 8, 13, and 17. The intersection of these two rowid lists is a list of the rowids in common or 8 and 13. If an index access method for index 300 is also selected, then another rowid list of eight entries—2, 5, 8, 9, 12, 15, 16, and 18 —would be generated and intersected with the rowid lists from indexes 200 and 400. The result would be a rowid list of rowid 8. Even though using index 300 has a marginal benefit of reducing by one the number of rows that would have to be fetched from table 100, the cost of generating that eight-entry rowid list and finding another intersection can exceed that marginal benefit. Therefore, it is desirable to generate an index access path without overselecting the indexes in processing a query.

One advantage of both conventional approaches is that there is relatively little overhead associated with the index selection process. In contrast, an exhaustive search of all the possible index access paths for a query requires a substantial amount of computing resources. In fact, it is possible that an exhaustive search consumes more computing resources than the savings it produces in finding the best performing index access path.

Therefore, it is desirable to generate a better performing index access path without having to inspect every possible selection of indexes.

SUMMARY OF THE INVENTION

In accordance with an aspect of the invention, a method for generating an index access path from a list of indexes and a WHERE-clause comprises the step of generating index access methods from the sorted list of indexes and the WHERE-clause. An index access method refers to one of the indexes and includes an access key for a column of the referenced index based on a predicate of the WHERE-clause. A cost is computed for an index access method, and the index access path is selected among the index access methods according to the computed cost.

According to various aspects of the invention, the method sorts the list of indexes by the number of columns upon which they are built and performs multiple passes over the sorted list of indexes. No predicate of the WHERE-clause is used in more than one index access method. A marginal benefit for an index access method is calculated according a computed selectivity factor for the index access method.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for generating an index access path are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 6:
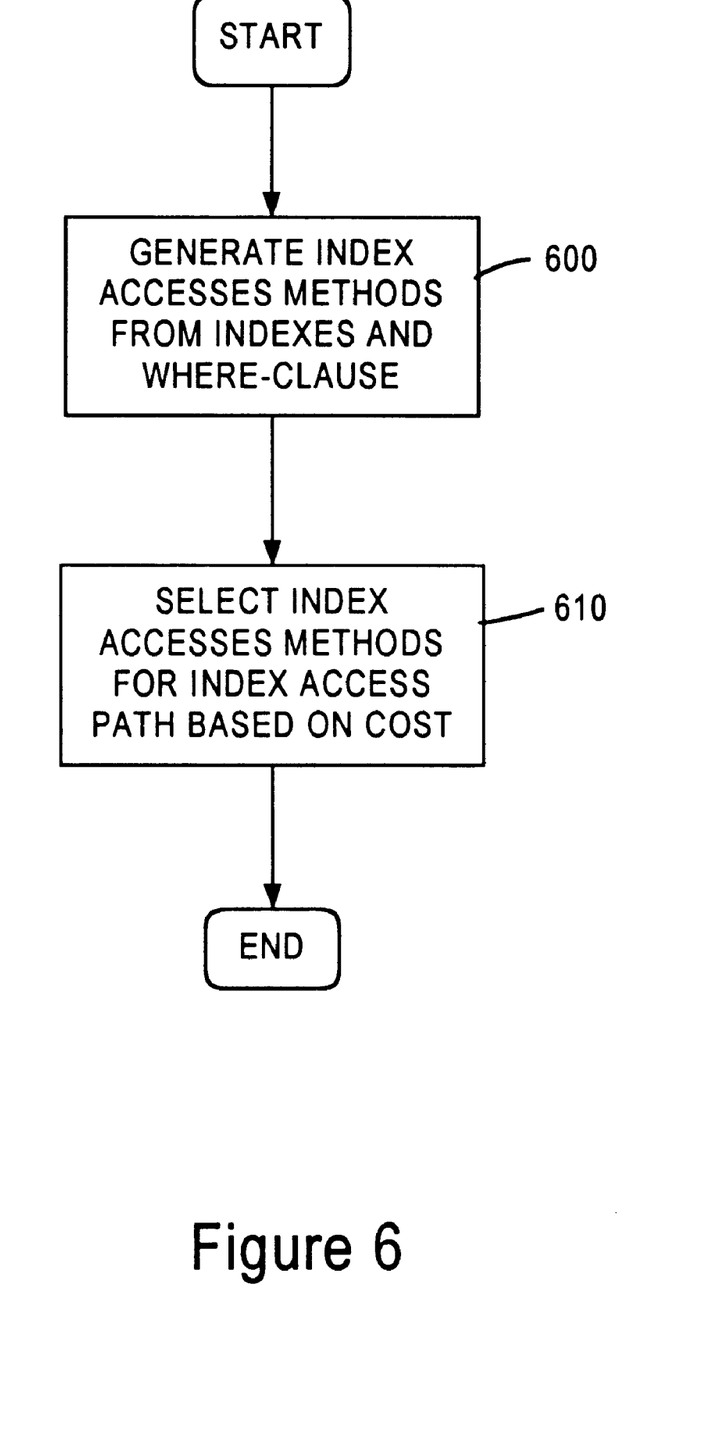
FIG. 6 is a flowchart describing steps for generating an index access path from a list of indexes and a WHERE-clause according to an embodiment of the invention.

FIG. 6 illustrates steps for generating an index access path according to an embodiment of the invention. There are two high-level phases in generating an index access path from a list of indexes and a WHERE clause. In the first phase (step 600), a set of index access methods is generated from a list of indexes and multiple passes over a WHERE clause. For the second phase, (step 610), the generated index access methods are selected, based on cost, for the index access path.

INDEX ACCESS METHODS

An index access method specifies how of a list of rowids is produced from a given index according to one or more predicates of the WHERE clause. In particular, an index access method employs one or more access keys, derived from those predicates. For example, an index access method generated from index 300 and predicate c2>5 of a WHERE clause has a start key of {>5} for index 300, which directs all rowids for key value entries greater than five to be produced. In this case, the index access method produces rowids 2, 5, 8, 9, 12, 15, 16, and 18. The phrase "index access method for an index" describes an index access method generated from that index and used for retrieving rowids from that index.

ACCESS KEYS AND FILTERS

Access keys and filters indicate how a specific index is to be accessed by an index access method in conjunction with a predicate. According to one embodiment predicates are used to access an index in three ways: as start keys, as stop keys, and as index filters. Start keys and stop keys govern the how an index is to be searched for index entries and are used for positioning within the index so that the search is restricted to the relevant portion of the index.

The start key specifies the initial key value for the beginning of a retrieval of index entries from the index for rowids, and the stop key specifies the final key value. The key value for a start key or stop key may be either inclusive or exclusive. An inclusive access key matches key values of the index that are equal to the key value of the access key. For example, given an inclusive start key of 4 for an access key of an index access method for index 200, index entries 236–244 are searched. Index entry 236 has a key value of 4 and is included by the start key. The notation {>=4} denotes this start key. Given an exclusive stop key of 6, or {<6}, on the same index, index entries 230–238 are searched. Index entry 240, with a key value of 6, is not included.

An index access method can have both a start key and a stop key. For example, the combination of start key {>=4} and stop key {<6}, directs index entries 236 and 238 to be searched. Since an index is ordered, the beginning of the search can quickly be found. For example, if the index is implemented as a B-tree, the B-tree is traversed to find the first index entry with the starting key value. Referring to FIG. 2(b), the traversal of B-tree 200 for start key {>=4} visits branch node 250, then branch node 262, and finally leaf node 272. Since the start key is inclusive, the rowids of the first index entry of leaf node 272 with a key value of 4 are produced from the search. The traversal continues with leaf node 272, producing rowids 10 and 18.

A start key is a key value at the beginning of a range of key values that satisfy a predicate, and any predicate with a greater-than (>) relation or a greater-than-or-equal-to (>=) relation can specify the key value of a start key. Likewise, a stop key is a key value at the end of a range of values that satisfy a predicate. Accordingly, any predicate with a less-than (<) or less-than-or-equal (<=) relation can specify the key value of a stop key. A predicate with an equality (=) relation can specify both a start key and a stop key simultaneously. For example, a predicate of $c1>=2$ can specify an inclusive start key, a predicate of $c1=2$ can specify both a start key and a stop key. Mathematically, $c1=2$ is equivalent to $c1>=2$ AND $c1<=2$.

A start or stop key for a multi-column index specifies a start or stop key value for the first column of the multi-column index and for a consecutive sequence of columns after the first column. In other words, multi-column start keys and stop keys are not allowed to contain gaps since in general a predicate on a column after such a gap cannot effectively be used to restrict the search of the index to only the relevant parts of the index. For example, if there is a multi-column index built on three columns ($c1$, $c2$, and $c3$) in that order, a start key for that index can specify a value for $c1$, or a value for $c1$ and $c2$, but cannot specify values for $c2$ without specifying values for $c1$. Thus, if there is a predicate $c2>2$ in a WHERE clause but no predicate referencing $c1$, then the predicate $c2>2$ cannot specify a start key for an index built on columns $c1$, $c2$ and $c3$. However, this predicate may used as an index filter.

An index filter, the third type of predicate usage for accessing an index, specifies a predicate that is evaluated on an index but does not restrict which range of rows of an index is accessed. As a result, index filters are generated from predicates for a multi-column index when those predicates cannot be used as either a start or a stop key. For example, given a multi-column index of three columns, $c1$, $c2$, and $c3$, and two predicates $c1=2$ and $c3=8$, that multi-column index can have an index access method containing a start key of $c1>=2$, a stop key of $c1<=2$, and an index filter of $c3=8$.

TYPES OF INDEX ACCESS METHODS

In an embodiment of the invention, there are four types of index access methods: a single-column index access method, a fully matched multi-column index access method, a partially matched multi-column index access method, and a singly matched multi column index access method.

A single-column index access method is an index access method for an index built on only one column. For example, any index access method for index 200 is a single-column index access method because index 200 is built on only one column. The remaining types of index access methods are for multi-column indexes and depend on the number of columns associated with an access key.

A fully matched multi-column index access method has an access key for each column of a multi-column index. Thus, for an index access method for multi-column index 500 to be fully matched, there must be an access key for column $c3$ and another access key for column $c1$. In fact, the example WHERE-clause as described above would yield a fully matched multi-column index access method with index 500, because the predicate $c3=8$ specifies a start and stop key for column $c3$ and the predicate $c1=2$ specifies a start and stop key for column $c1$.

A partially matched multi-column index access method has an access key for at least two columns of a multi-column index, but there is at least one column without an access key. As a result, the corresponding multi-column must be built on at least three columns. For example, given predicates $c1=2$ and $c3=8$ and a multi-column index on columns $c1$, $c2$, and $c3$, there would be a start key and a stop key for column $c1$, an index filter for column $c3$, but no key for column $c2$. Since there are keys for at least two columns but no key for at least one of the columns, this index access method is a partially matched multi-column index access method.

A singly matched multi-column index access method has an access key for only one column of a multi-column index. For example, given a predicate of $c1=2$ and multi-column index 500, the resulting index access method has an access for only one column of multi-column index 500, column $c1$.

A HEURISTIC RANKING OF INDEX ACCESS METHODS

A heuristic is simply a "rule of thumb" that successively selects the most appropriate solution. The appropriateness of a solution is determined with regard to the general case, even though there may be exceptions to that general case. Heuristic rules are useful, despite the exceptions, because they are designed to be easier to apply than finding the exceptions.

Generally, it is desirable to avoid accessing and combining the output of several indexes if it is possible to retrieve the same set of rowids from a single index. For example, given predicates $c1=2$ and $c3=8$, it is better to use multi-column index 500 than intersecting individual indexes 200 and 400. Thus an index access method on index 500 produces a rowid list with the two entries from a single traversal of index 500. On the other hand, combining indexes 200 and 400 requires two retrievals from an index, followed by a computation of the intersection of the two resulting lists of rowids.

Therefore, fully matched multi-column index access methods and partially matched multi-column index access methods should be considered before either single-column index access methods or singly matched multi-column index access methods. As a result, an embodiment of the invention sorts all the given indexes by number of columns. In this manner, fully matched index access methods and partially matched index access methods can be considered before single-column index access methods.

If there are two multi-column indexes that match a set of predicates, one of which is fully matched and the other of which is partially matched, it is generally better to use the fully matched multi-column index. Fully matched multi-column indexes are preferred because a fully matched index is likely to be the smaller because it is built on a fewer number of columns. In addition, fully matched indexes will have fewer distinct entries.

Many implementations of indexes coalesce the rowids for the same key value into an entry containing a list or bitmap of rowids. Compared to a fully matched index, a partially matched index may have more entries that match a given key. For example, a key value of $c3=7$ retrieves one index entry 444 for index 400, but three entries (552–556) in multi-column index 500. The three rowid lists or bitmaps for the separate entries in index 500 must be merged into one combined rowid list. For a similar reason, it is generally better to use a single column index access method, which is trivially fully matched, than a singly matched multi-column index access method.

Therefore, fully matched multi-column index access methods should be considered before partially matched multi-column index access methods, and single-column index access methods should be considered before singly matched multi-column indexes. Accordingly, a heuristic ranking of the four types of index access methods is:

(1) Fully matched multi-column index access;

(2) Partially matched multi-column index access methods;

(3) Single-column index access methods; and (4) Singly matched multi-column index access.

GENERATING INDEX ACCESS METHODS

Figure 7:
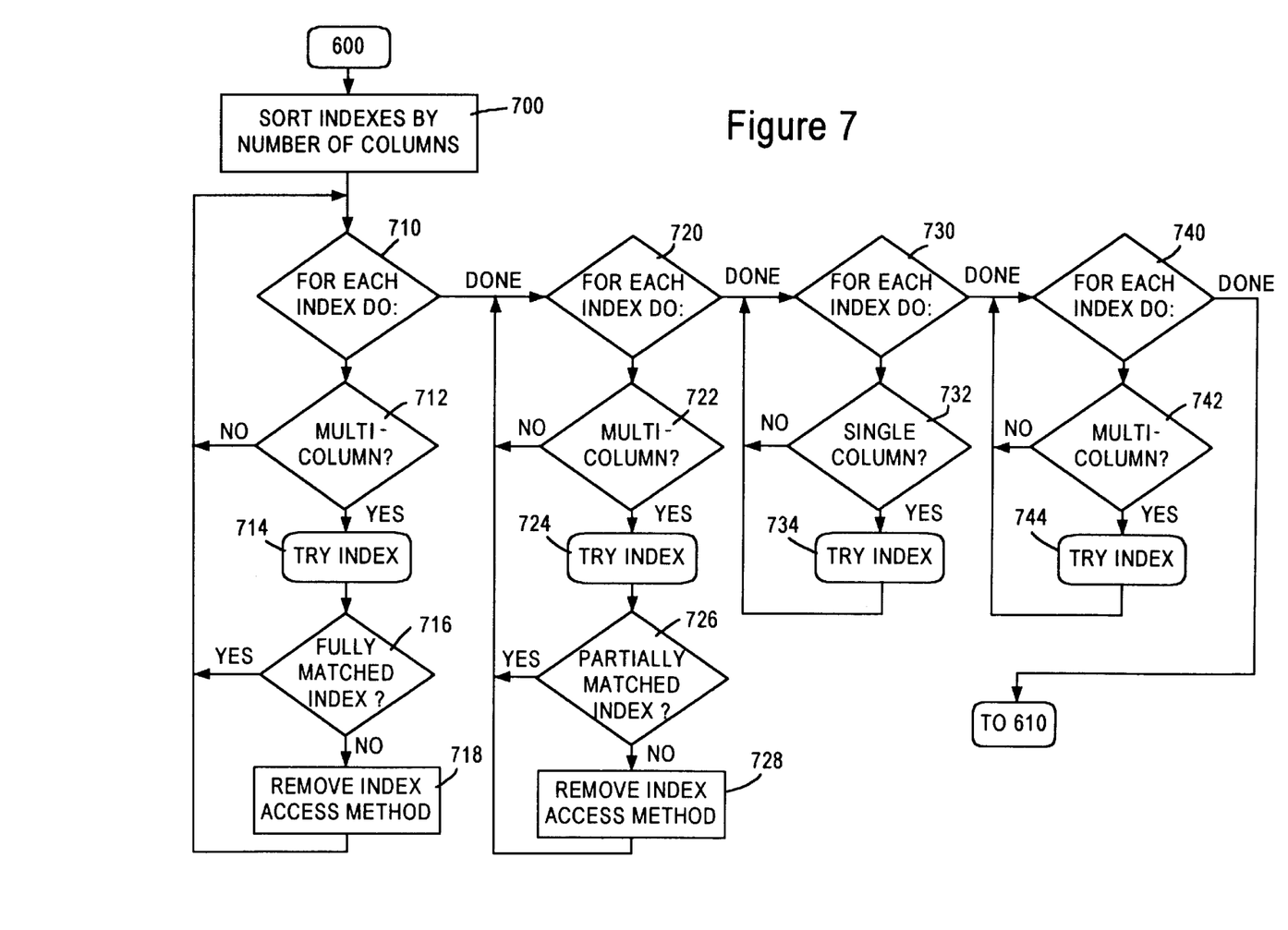
FIG. 7 is a flowchart describing steps for generating index access methods from the sorted list of indexes according to an embodiment of the invention.

FIG. 7 is a flow chart illustrating steps performed during step 600 to generate a set of index access methods from a list of indexes. Referring to FIG. 7, in step 700 the list of indexes is sorted, in decreasing order, by the number of columns that each index is built on. For example, given a list of indexes consisting of indexes 200, 300, 400, and 500, the resulting sorted list has index 500 as the first index because index 500 is built on two columns, and each of indexes 200, 300, and 400 is built on only one column. Indexes built on the same number of columns may occur in any relative order.

A plurality of index access methods is generated from multiple, successive passes over the sorted list of indexes. Each pass over the sorted list of indexes is designed to generate a specific kind of index access method, e.g., a single-column index access method. The order in which the passes are executed is based on the heuristic ranking of the kinds of index access methods.

Step 710 receives the sorted list of indexes and processes each entry in the list. On each iteration, step 712 checks to see if the current index is a multi-column index. If the current index is not a multi-column index, control returns to the beginning of the loop (step 710). According to one embodiment, the processing of the sorted list of indexes is aborted upon finding a single column index, because there are no multi-column indexes remaining in the list.

On the other hand, if the current index is a multi-column index, a procedure, described below, is called (step 714) to generate and save an index access method for that index based on the unused predicates in the WHERE clause. After the procedure generates and saves an index access method for the current index, step 716 checks the saved index access method to see if it is fully matched, i.e., there is an access key for all the columns of the index. If the index access method not fully matched, step 718 removes the index access method from consideration at this point. Finally, control returns to step 710 for another iteration of the first pass loop.

After the first pass is complete, control proceeds to step 720 to find partially matched multi-column indexes. The operation of steps 720, 722, and 724 of the second pass is similar to the operation of steps 710, 712, and 714, respectively, of the first pass. Step 726, however, checks for a partially matched index instead of a fully matched index. In other words, step 726 will indicate "yes" if at least two of the columns have an access key. According to one embodiment, checking for a column without an access key is not performed, since if the index did not contain such a column it would be a fully matched multi-index column and would have been considered on the first pass.

The third pass starts at step 730 after the second pass is complete. On each iteration, step 732 checks to see if there is only one column for the current index. If the current index is a single-column index, then step 734 generates and saves an index access method for that index based on the unused predicates in the WHERE clause. After step 735 is finished, the execution returns to step 730 for another iteration.

After the third pass is complete, step 740 controls the fourth and final pass. The operation of the fourth pass is similar to the third pass, except that step 742 checks for a multi-column index. In order words, steps 740 and 744 operate like steps 730 and 734, respectively. As in the first pass, the processing of the sorted list of indexes is aborted upon finding a single column index because there are no multi-column indexes remaining in the list. Upon completion of the fourth pass, control proceeds to step 610, whose detailed operation is described below.

GENERATING AN INDEX ACCESS METHOD FROM A WHERE CLAUSE

Figure 8:
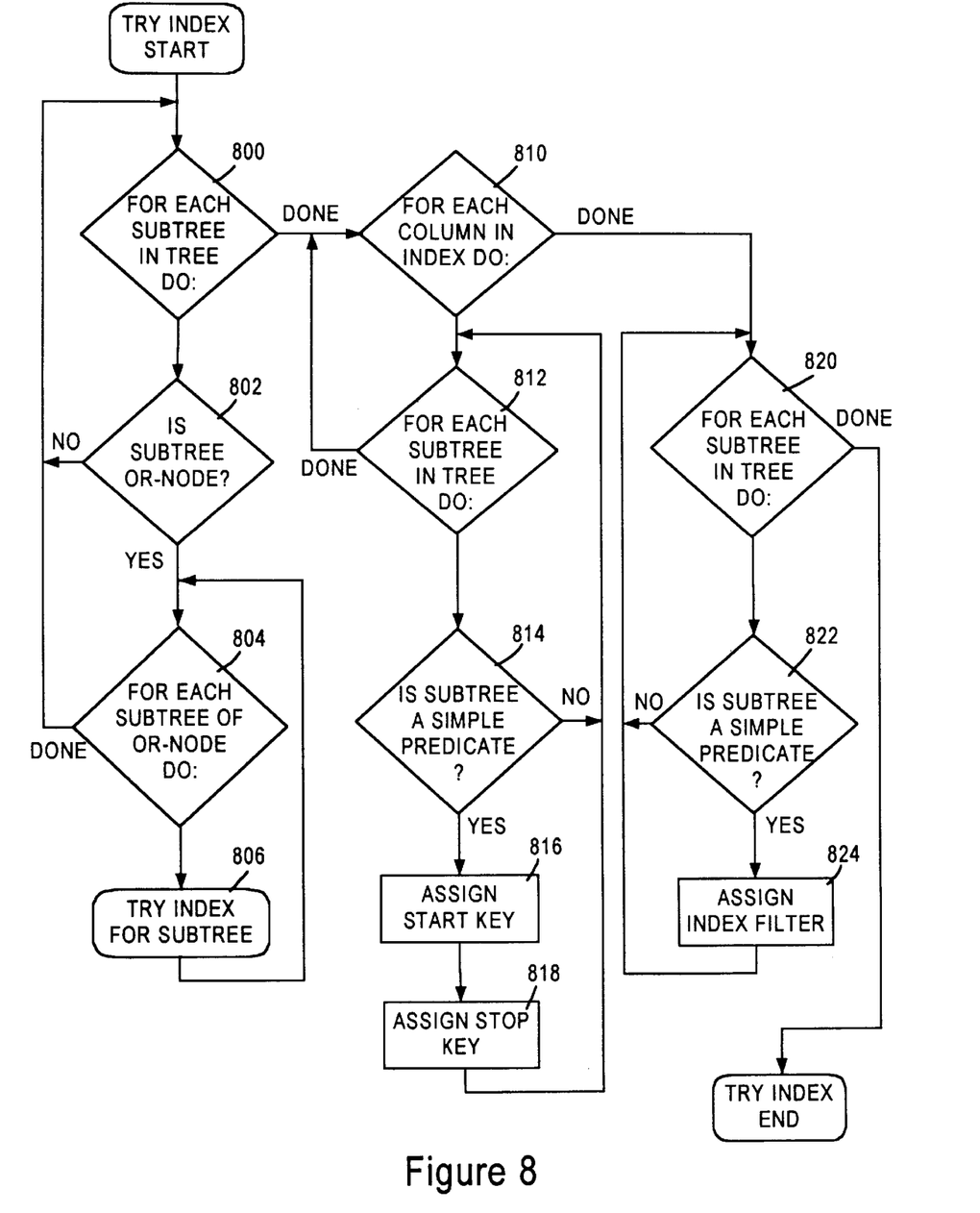
FIG. 8 is a flowchart describing steps for generating and saving an index access method based on a given index and the unused predicates of a given WHERE-clause according to an embodiment of the invention.

Steps 714, 724, 734, and 744 generate and save an index access method based on a given index and the unused predicates of a given WHERE clause, according to the steps shown in FIG. 8. For convenience of processing, the given WHERE clause has been parsed into a predicate tree. The specific internal representation of the predicate tree will vary from implementation to implementation, and there is a wide variety of techniques known in the art.

According to one embodiment, the internal representation of a predicate tree is an AND/OR tree. The leaf nodes of an AND/OR tree are simple predicates and the internal nodes are either AND-nodes ("conjunctions") or OR-nodes ("disjunctions"). Each internal node has one or more subtrees, which may be either a leaf node or another internal node. Any negation is pushed to the leaf nodes of the predicate tree, using De Morgan's laws,e.g.,NOT(c1>=2 AND c2<=10) is converted to c1<2 OR c2>10. In addition, a single predicate that is the subtree of an OR-node is converted to an AND-node with a single OR-node. Likewise, a top-level OR node is converted to a top-level AND-node with the OR-node as its subtree.

In FIG. 8, there are three main loops, starting at steps 800, 810, and 820. In the first loop, starting at step 800, each subtree of the predicate tree is examined to see if there is a disjunction of predicates (step 802). If there is an OR-node in a subtree, then, in a loop over the subtrees of the OR-node (step 804), the procedure is recursively called for each subtree (step 806), and the results are maintained as a union of index access methods. Unless an index access method can be established for each subtree of an OR-node, the methods that are found are rejected and discarded.

The second main loop, comprising steps 810–818, finds valid start and stop keys for each column in the given index. Step 810 iterates over each column in the index from the first column to the last. For each column, step 812 iterates over each predicate subtree of the predicate tree. If the predicate subtree is a simple predicate, i.e., not a conjunction or disjunction but an equality or inequality relation (step 814), then steps 816 and 818 are executed to assign a valid start or stop key. After step 818 has executed, or if the predicate subtree is not a simple predicate, then the execution of the inner loop resumes at step 812.

For steps 814, 816, and 824, the simple predicate under consideration must not have been used for an access key of another index access method, because once a predicate has been used, reusing it does not further reduce the number of rows in the table to consider. For example, given predicates c1=2 and c3=8, the rows determined by using both predicates on multi-column index 500 have rowids of 8 and 13 (see entry 558). Reusing the first predicate for index 200 determines five rows identified by rowids 3, 7, 8, 13, 14 (see entry 232). Since the second list of rowids is a superset of the first list, the second list provides no further information.

Step 816 assigns a start key for the current index column if the predicate can be used as a start key and no start key has been assigned for that current index column. A predicate can be used as a start key, if it is unused and of the proper form. A predicate is of the proper form for a start key if it is an equality, greater-than, or greater-than-or-equal-to relation. Furthermore, a start key cannot be assigned if the previous column in the index does not have a start key, which is why step 810 iterates over the columns in order.

Step 818 assigns a stop key for the current index column if the predicate can be used as a stop key and no stop key has been assigned for that current index column. A predicate can be used as a stop key, if it is unused and of the proper form. A predicate is of the proper form for a stop key if it is an equality, less-than, or less-than-or-equal-to relation. Furthermore, a stop key cannot be assigned if the previous column in the index does not have a stop key, which is why step 810 iterates over the columns in order.

Since steps 816 and 818 are executed one after the another for each simple predicate, an equality predicate will tend to be used as a start and a stop, unless the WHERE clause is pathological, i.e., WHERE c1>5 AND c1=6. In this case, the pathological situation is eliminated by reordering the predicates of the WHERE clause so that equality predicates are considered before inequality predicates. After nested loops controlled at steps 810 and 812 are terminated, control passes to step 820.

Step 820, the third main loop, is another pass through the predicate subtrees of the current AND-node, but looking for index filters. If the predicate subtree is a simple predicate (step 822), then an index filter is assigned, if possible (step 824). For an index filter to be assignable, the simple predicate must be unused. Generally, an index filter would only be assigned if none of the predicates reference an internal (i.e., not the first or the last) column of a multi-column index. Otherwise, the previous loop of step 810 would have detected the predicate and assigned a start or stop key for it.

After the third main loop is executed, the routine returns to the caller.

ILLUSTRATION OF THE INDEX ACCESS METHOD SELECTION

The operation of the index access method selection phase is illustrated with reference to the WHERE clause of c1=2 AND c2>5 AND c3=8, table 100 of FIG. 1, indexes 200–500 of FIGS. 2–5, and the flowcharts of FIGS. 7 and 8.

Starting at step 700, the indexes are sorted by number of columns. As a result, multi-column index 500 is considered before any of single-column indexes 200, 300, or 400. Step 710 controls the first pass, and step 712 ensures that only the multi-column indexes are considered, meaning in this example only index 500. Step 714 calls the routine to generate an index access method for index 500 and the WHERE clause. The first loop of the routine starting at step 800 scans the WHERE clause for OR-nodes. In this example, the test of step 802 is always "no," because there are no OR-nodes in the WHERE-clause. As a result, the first loop terminates without recursively calling itself, and execution proceeds to the second loop starting at step 810.

The second loop at step 810 iterates over the columns upon which the index is built. Thus, column 124 of table 100 is considered before column 120 of table 100 is considered. Step 812 iterates over the sub-predicates of the WHERE-clause, and step 814 only allows simple predicates, i.e., c1=2, c2>5, and c3=8, to be considered. Step 816 looks for possible start keys, which for column c3, only predicate c3=8 qualifies. The same predicate also qualifies as a stop key in step 818. As a result, a start key derived from predicate c3=8 and a stop key derived from predicate c3=8 are assigned to index 500. In the next iteration of the loop controlled by step 810, a start key derived from predicate c1=2 and a stop key derived from predicate c1=2 are assigned to index 500. No key is assigned for column c2, because it is not a part of index 500.

The third loop at step 820 iterates over the simple predicates (cf. Step 822) for index filters, but no predicate in this WHERE clause qualifies. After the third loop is complete, control returns to caller, or step 714. As a result, this procedure call produces an index access method on index 500 with start and stop keys for each column of index 500.

After step 714 is complete, step 716 checks to see if index 500 is a fully matched multi-column index. Since each column of index 500 was assigned a key in step 714, index 500 is a fully matched multi-column index thus step 718 is skipped. Since there are no other multi-column indexes in the example, the first pass is finished.

In the second pass starting at step 720, the multi-column indexes are again considered (due to step 720). However, on this iteration, index 500 is not matched because the only predicates that would match index 500 have already been used in the first pass.

The third pass starts at step 830 and considers only the single-column indexes (due to step 832). Step 834 tries to produce an index access method for each single column index, i.e., indexes 200, 300, and 400. Since the predicates referring to columns c1 and c3 have already been used, the only index access method is generated is an index access method on index 300 with a start key derived from predicate c2>5.

Therefore the result of the first phase is a list of index access methods with two nodes. One node is an index access method on index 500 with a start key of c3=8, c1=2 and a stop key of c3=8, c1=2. The other node is an index access method on index 200 with a start key of c2>5.

COST/BENEFIT PHASE

Figure 9:
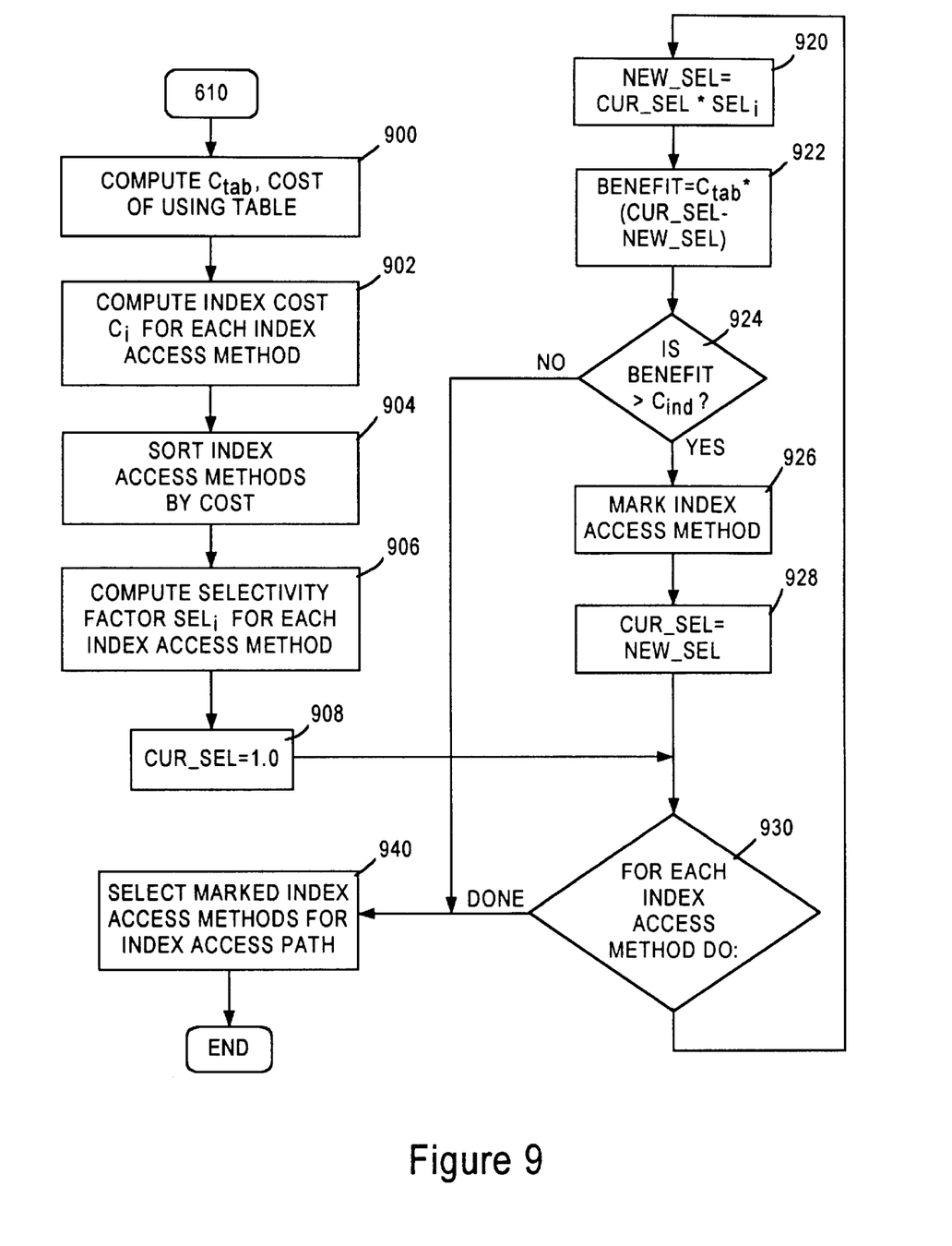
FIG. 9 is a flowchart describing a cost/benefit operation according to an embodiment of the invention.

The operation of the cost/benefit phase is shown in the flowchart of FIG. 9. Step 900 of the cost/benefit phase assigns a cost to using the table according to a cost metric. Similarly, step 902 computes the cost of using each index access method. In order to perform the cost/benefit analysis, an embodiment of the invention requires the use of some costing metric, but not any particular mechanism. The specific metric would vary from implementation to implementation. A wide variety of techniques are known in the art and described in the literature.

COST METRIC

According to one embodiment, the cost is determined by how much data would possibly be read from non-volatile storage, such as a hard disk. Other embodiments may consider the amount of computing resources used by the central processing unit, or the costs of network traffic, or a combination of costs.

For purposes of illustration, a cost metric based on the amount of data possibly read from non-volatile is used. In this metric, we assume that the cost of reading a row from a table is 1. The cost of searching a table without the aid of an index is proportional to the size of the table, in our example 18 for table 100. The cost of using an index is proportional to those parts of the index that are traversed during the access, and additional cost may occur if all the entries matching a key do not fit into a single leaf node of the index. For simplicity, we will assume that each index search for our example has a cost equal to number of index entries that match the search criteria. Thus, the cost of using index 300 with the predicate c2>5 is 4, and the cost of index 500 with the predicates of c3=8 and c1=2 is 1.

The cost of a union of index access methods is estimated as the sum of the costs of the individual index access methods and conjunctions of index access methods of the OR-node. The cost of an intersection of index access methods is estimated as the product of the smallest cost of the index access methods and the number of index access methods in the conjunction.

After all the costs for index access method are computed, the list of index access methods is sorted in order of lowest cost to highest cost (step 904). For the query of our example with indexes 200 through 500, the first phase produces two index access methods, one on index 300 and another on index 500. Since the index access method on index 500 has a smaller cost of 1 compared to a cost of 4 for the index access method on index 300, the index access method on index 500 is sorted to be first.

SELECTIVITY FACTORS

Another important calculation, performed in step 906, is to compute a selectivity factor for each index access method and each union of index accesses. The use of any particular index access method will tend to reduce the number of rows of the table under consideration by a certain amount. The reduced amount, if expressed as a ratio, is a selectivity factor.

According to one embodiment of the invention, the selectivity factor is estimated by determining the number of values and the minimum and maximum value of the index and assuming a uniform distribution of values within the index. For example, the selectivity factor for index 200 with predicate c1=2 under this approach would be $\frac{1}{8}$ or 0.13. While the uniform distribution approach is fairly straightforward to calculate, it suffers in accuracy, because that predicate is responsible for five of eighteen rows of table 100 for a selectivity factor of 0.28.

According to another embodiment of the invention, the selectivity factor is determined by maintaining a histogram of values that the index uses. Thus, the selectivity factor for an index access method for index 200 is obtained by looking up the index value in the histogram. In the example, the selectivity obtained would be $\frac{5}{18}$=0.28. Similarly, the selectivity factors for index access methods on indexes 300, 400, and 500, are 0.44, 0.17, and 0.11, respectively.

The selectivity factor of a union is estimated as the sum of the selectivity factors of the constituent index access methods or intersection of index access methods. The selectivity factor of an intersection is estimated as the product of the selectivity factors of the branches.

MARKING INDEX ACCESS METHOD BY A COST/BENEFIT ANALYSIS

After the relevant costs and selectivity factors are computed in steps 900–906, the cost/benefit loop commences with an initialization step 908. Step 908 initializes a current selectivity factor variable, CUR_SEL, to 1.0, and control passes to step 930 which iterates over the index access methods in the sorted list of index access methods.

The first step of the loop proper is step 920 in which a new selectivity factor, NEW_SEL, is calculated by taking the product of the current selectivity factor and the selectivity factor for the index access method. In our example, the index access method on index 500 has a selectivity factor of 0.11, so the NEW_SEL=1.0×0.11=0.11. The next step, step 922, calculated the marginal benefit of using the index access method. The marginal benefit is the cost of reading the rows of the table that the index access method avoids. Thus, the proportion of rows the index access method avoid reading is the difference in the selectivity factors or (CUR_SEL–NEW_SEL). The marginal benefit is the product of that difference and the cost reading the table, $C_{tab}$, or BENEFIT= $C_{tab}$×(CUR_SEL–NEW_SEL). In our example, BENEFIT=18×(1.00–0.11)=18×0.89=16.

Step 924 compares the marginal benefit to the cost of using the index access method under consideration. If the benefit does not exceed the cost, then the loop terminates and proceeds to step 940. If the benefit does exceed the cost, then execution passes to step 926, where the index access method is marked. In our example, the cost of using the index access method based on index 500 is 1 but the marginal benefit is 16. Thus, the index access method is marked.

In marking an index access method, if the index access method is a union of index access methods, then each index access method of the union is also marked. However, if there is an intersection of index access methods underneath the union, at least one index access method in the intersection is marked.

After the index access method is marked, the current selectivity factor is updated by assigning it to the value of the new selectivity factor (step 928). The loop repeats through step 930 until either the marginal benefit of using the index access method does not exceed its marginal cost (step 924) or all the index access methods have been considered (step 930).

In the example, the loop progresses through a second iteration, this time considering the index access method on index 300. The new selectivity factor is 0.11×0.44 =0.05 (step 920). The marginal benefit is 18×(0.11–0.05)=18× 0.06=1.1 (step 922), but the cost of using the index access method is 4 (compared in step 924). Thus, the loop terminates and the index access method on index 300 is not marked.

After the cost/benefit loop is completed, all the marked index access methods are selected for an index access method path (step 940). In this manner, index access methods are only selected for the index access method path if it is cost effective to do so. In the example, the cost using an index access method on index 300 did not outweigh the benefit of using the index access method.

What is claimed is:

1. A method for generating an index access path for use in processing a query that includes a WHERE clause having a predicate that references a column of a table from a plurality of indexes built on the table, said method comprising the computer-implemented steps of:

generating a plurality of index access methods for the table from said plurality of indexes built on the table based on the WHERE clause;

computing costs for the index access methods; and selecting said index access path based on the costs for the index access methods;

wherein each of the index access methods includes one or more index access keys, and each of the one or more index access keys includes a key value, based on a predicate of the WHERE clause, for comparison with values from a column of the table upon which one of the indexes was built.

2. The method of claim 1, wherein the step of generating a plurality of index access methods for the table from said plurality of indexes built on the table based on the WHERE clause includes the steps of:

performing a plurality of passes over the indexes in order of indexes with greatest number of columns to least number of columns; and generating the plurality of index access methods during the passes based on WHERE clause.

3. The method of claim 2, wherein the step of generating the plurality of index access methods during the passes based on WHERE clause includes the steps of:

generating a fully matched index access method, wherein the fully matched index access method has a reference to an index built on a plurality of columns and an access key for each column of the plurality of columns;

generating a partially matched index access method, wherein the partially-matched index access method has a reference to an index built on a plurality of columns and an access key for each of a plurality of the plurality columns;

generating a single-column index access method, wherein the single column index access method has a reference to an index built on exactly one column and an access key for the column; and generating a singly matched index access method, wherein the singly matched index access method has a reference to an index built on a plurality of columns and an access key for one column of the plurality of columns.

4. The method of claim 3, wherein the step of generating a fully matched index access method includes the steps of:

generating a plurality of index access methods, wherein each of said plurality of index access method has a reference to an index built on a plurality of columns; and removing an index access method from the plurality of index access method, wherein the removed index access method does not have a key for each column of the plurality of columns.

5. The method of claim 3, wherein the step of generating a partially matched index access method includes the steps of:

generating a plurality of index access methods, wherein each of said plurality of index access method has a reference to an index built on a plurality of columns; and removing an index access method from the plurality of index access method, wherein the removed index access method does not have a key for a plurality of columns of the plurality of columns.

6. The method of claim 3, wherein:

the step of generating a fully matched index access method is performed before the step of generating a partially matched index access method;

the step of generating a partially matched index access method is performed before the step of generating a single-column index access method; and the step of generating of a single-column index access method is performed before the step of generating a singly-matched index access method.

7. The method of claim 2, further comprising the step of:

parsing said WHERE clause into a predicate tree.

8. The method of claim 7, wherein the step of parsing said WHERE clause into a predicate tree includes the step of parsing said WHERE clause into an AND/OR predicate tree.

9. The method of claim 1, wherein the step of generating the plurality of index access methods built on the table from said plurality of indexes based on WHERE clause includes the step of generating the plurality of index access methods, wherein no predicate of said WHERE clause is used for generating more than one access key of said plurality of indexes access methods.

10. The method of claim 1, wherein the step of computing costs for the index access methods includes the step of computing the cost for the index access method based on an estimated amount of data read from a non-volatile storage.

11. The method of claim 1, wherein the step of selecting said index access path based on the costs for the index access methods includes the steps of:

sorting said plurality of index access methods by cost;

calculating a marginal benefit for said index access method; and if said marginal benefit for said index access method exceeds the cost for a lower cost index access method, then designating said index access method for said index access path.

12. The method of claim 11, wherein the step of calculating a marginal benefit for said index access method includes the steps of:

determining a selectivity factor for said index access methods; and calculating the marginal benefit for said index access method based on the selectivity factor.

13. The method of claim 12, wherein the step of determining a selectivity factor for said index access method includes the steps of:

generating a histogram of key values based on an index referenced by said index access method; and determining the selectivity for the index access method based on the histogram.

14. A computer readable medium having stored thereon sequences of instructions for generating an index access path for use in processing a query that includes a WHERE clause having a predicate that references a column of a table from a plurality of indexes built on the table based on a WHERE clause, said sequences of instructions including instructions for performing the steps of:

generating a plurality of index access methods for the table from said plurality of indexes built on the table based on the WHERE clause;

computing costs for the index access methods; and selecting said index access path based on the costs for the index access methods;

wherein each of the index access methods includes one or more index access keys, and each of the one or more index access keys includes a key value, based on a predicate of the WHERE clause, for comparison with key values from one of the indexes.

15. The computer readable medium of claim 14, wherein the step of generating a plurality of index access methods for the table from said plurality of indexes built on the table based on the WHERE clause includes the steps of:

performing a plurality of passes over the indexes in order of indexes with greatest number of columns to least number of columns; and generating the plurality of index access methods during the passes based on WHERE clause.

16. The computer readable medium of claim 15, wherein the step of generating the plurality of index access methods from the the passes based on the WHERE clause includes the steps of:

generating a fully matched index access method, wherein the fully matched index access method has a reference to an index built on a plurality of columns and an access key for each column of the plurality of columns;

generating a partially matched index access method, wherein the partially-matched index access method has a reference to an index built on a plurality of columns and an access key for a plurality of the plurality columns;

generating a single-column index access method, wherein the single column index access method has a reference to an index built on exactly one column and an access key for the column; and generating a singly matched index access method, wherein the singly matched index access method has a reference to an index built on a plurality of columns and an access key for one column of the plurality of columns.

17. The computer readable medium of claim 16, wherein the step of generating a fully matched index access method includes the steps of:

generating a plurality of index access methods, wherein each of said plurality of index access method has a reference to an index built on a plurality of columns; and removing an index access method from the plurality of index access method, wherein the removed index access method does not have a key for each column of the plurality of columns.

18. The computer readable medium of claim 16, wherein the step of generating a partially matched index access method includes the steps of:

generating a plurality of index access methods, wherein each of said plurality of index access method has a reference to an index built on a plurality of columns; and removing an index access method from the plurality of index access method, wherein the removed index access method does not have a key for a plurality of columns of the plurality of columns.

19. The computer readable medium of claim 16, wherein:

the step of generating a fully matched index access method is performed before the step of generating a partially matched index access method;

the step of generating a partially matched index access method is performed before the step of generating a single-column index access method; and the step of generating of a single-column index access method is performed before the step of generating a singly-matched index access method.

20. The computer readable medium of claim 15, further comprising the step of:

parsing said WHERE clause into a predicate tree.

21. The computer readable medium of claim 20, wherein the step of parsing said WHERE clause into a predicate tree includes the step of parsing said WHERE clause into an AND/OR predicate tree.

22. The computer readable medium of claim 14, wherein the step of generating the plurality of index access methods built on the table from said plurality of indexes based on WHERE clause includes the step of generating the plurality of index access methods, wherein no predicate of said WHERE clause is used for generating more than one access key of said plurality of indexes access methods.

23. The computer readable medium of claim 14, wherein the step of computing costs for the index access methods includes the step of computing the cost for the index access method based on an estimated amount of data read from a non-volatile storage.

24. The computer readable medium of claim 14, wherein the step of selecting said index access path based on the costs for the index access methods includes the steps of:

sorting said plurality of index access methods by cost;

calculating a marginal benefit for said index access method; and if said marginal benefit for said index access method exceeds the cost for a lower cost index access method, then designating said index access method for said index access path.

25. The computer readable medium of claim 24, wherein the step of calculating a marginal benefit for said index access method includes the steps of:

determining a selectivity factor for said index access method and calculating the marginal benefit for said index access method based on the selectivity factor.

26. The computer readable medium of claim 25, wherein the step of determining a selectivity factor for said index access method includes the steps of:

generating a histogram of key values based on an index referenced by said index access method; and determining the selectivity for the index access method based on the histogram.

* * * * *